United States Patent
Zhang et al.

(10) Patent No.: US 8,713,775 B2
(45) Date of Patent: May 6, 2014

(54) APPARATUS AND METHOD FOR SERVICING DYNAMOELECTRIC MACHINE COMPONENTS IN-SITU

(75) Inventors: Zhipeng Zhang, Schenectady, NY (US); Philip Alexander Shoemaker, Scotia, NY (US); Robert Jeffrey Pieciuk, Wynantskill, NY (US); Weston Blaine Griffin, Niskayuna, NY (US); Arvind Rangarajan, Rexford, NY (US); Diego Quinones, Rexford, NY (US); Prabhjot Singh, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 363 days.

(21) Appl. No.: 13/161,579

(22) Filed: Jun. 16, 2011

(65) Prior Publication Data

US 2012/0317771 A1    Dec. 20, 2012

(51) Int. Cl.
*B25B 27/14* (2006.01)
*B23P 6/00* (2006.01)

(52) U.S. Cl.
USPC ... 29/281.6; 29/889.1; 29/402.01; 29/402.19; 356/241.3

(58) Field of Classification Search
USPC .............. 29/889.1, 402.01, 402.19, 402.09, 29/402.11, 56.5, 281.6; 356/241.3; 451/356
See application file for complete search history.

(56) References Cited

U.S. PATENT DOCUMENTS

| | | | | |
|---|---|---|---|---|
| 4,011,017 A | * | 3/1977 | Feuerstein et al. | 356/241.6 |
| 4,078,864 A | * | 3/1978 | Howell | 356/397 |
| 4,298,312 A | * | 11/1981 | MacKenzie et al. | 415/118 |
| 4,784,463 A | * | 11/1988 | Miyazaki | 385/117 |
| 4,805,282 A | * | 2/1989 | Reaves et al. | 29/889.1 |
| 5,081,765 A | * | 1/1992 | Fraser et al. | 29/889.1 |
| 5,102,221 A | * | 4/1992 | Desgranges et al. | 356/72 |
| 5,197,191 A | * | 3/1993 | Dunkman et al. | 29/889.1 |
| 5,233,744 A | * | 8/1993 | Noland | 29/566.1 |
| 5,475,485 A | | 12/1995 | Diener | |
| 5,511,308 A | * | 4/1996 | Ng et al. | 29/889.1 |
| 5,644,394 A | | 7/1997 | Owens | |
| 5,803,680 A | * | 9/1998 | Diener | 409/130 |
| 6,302,625 B1 | * | 10/2001 | Carey et al. | 409/132 |
| 6,899,593 B1 | * | 5/2005 | Moeller et al. | 451/6 |
| 7,032,279 B2 | | 4/2006 | McCarvill et al. | |
| 7,084,971 B2 | * | 8/2006 | Diener et al. | 356/241.1 |
| 7,097,539 B2 | * | 8/2006 | Moeller et al. | 451/6 |
| 7,112,118 B1 | * | 9/2006 | Moeller et al. | 451/6 |
| 7,617,603 B2 | * | 11/2009 | Coleman et al. | 29/890.031 |
| 7,654,143 B2 | * | 2/2010 | Roney et al. | 73/620 |
| 7,766,726 B2 | | 8/2010 | Sherlock et al. | |
| 8,234,766 B2 | * | 8/2012 | Staffler et al. | 29/402.11 |
| 8,365,584 B1 | * | 2/2013 | Quinones et al. | 73/112.05 |
| 8,402,625 B2 | * | 3/2013 | Holmes et al. | 29/281.4 |

(Continued)

*Primary Examiner* — Essama Omgba
(74) *Attorney, Agent, or Firm* — James W. Pemrick; Ernest G. Cusick; Frank A. Landgraff

(57) ABSTRACT

An apparatus and method are provided for servicing a dynamoelectric machine component. The apparatus includes a tool delivery mechanism adapted for delivering a tool to a desired location in the dynamoelectric machine, and a tool support fixture adapted to be secured onto the body of the dynamoelectric machine, where the tool support fixture can be used for supporting and adjusting the tool delivery mechanism. A sleeve mechanism is attached to the tool support fixture, and the sleeve mechanism is disposed around a portion of the tool delivery mechanism. The apparatus is adapted to service the component of the dynamoelectric machine in-situ.

33 Claims, 14 Drawing Sheets

(56) References Cited

U.S. PATENT DOCUMENTS

| | | |
|---|---|---|
| 2006/0168809 A1 | 8/2006 | McCarvill et al. |
| 2007/0077148 A1* | 4/2007 | Bird .......................... 416/223 R |
| 2009/0129555 A1* | 5/2009 | Staffler et al. ................. 378/198 |
| 2009/0307891 A1* | 12/2009 | Offer et al. ................. 29/402.11 |
| 2011/0178727 A1* | 7/2011 | Hafenrichter et al. .......... 702/38 |
| 2013/0174397 A1* | 7/2013 | Katzenberger et al. ...... 29/426.2 |
| 2013/0199008 A1* | 8/2013 | Clark et al. .................. 29/23.51 |
| 2013/0232792 A1* | 9/2013 | Quinones et al. ............ 29/889.1 |

* cited by examiner

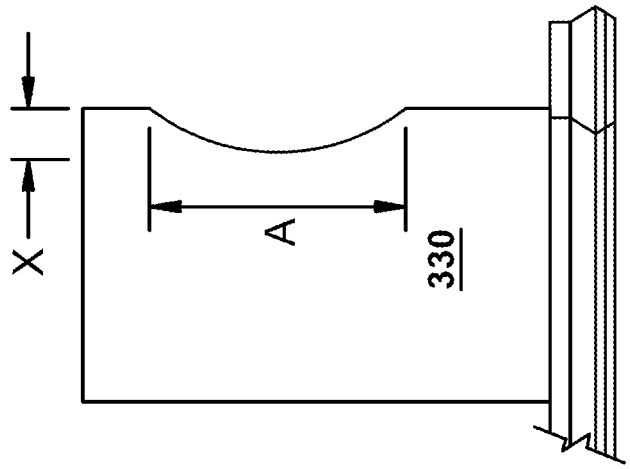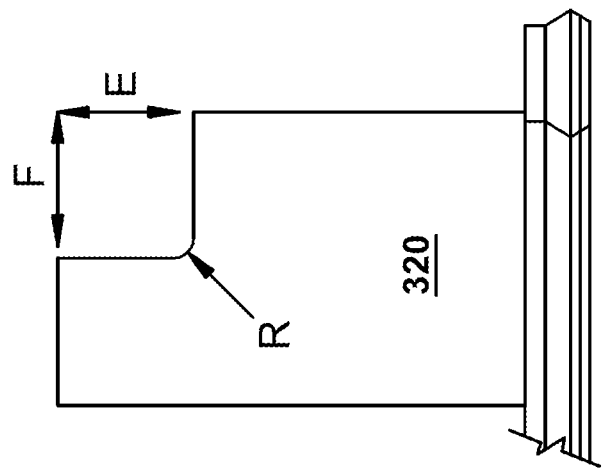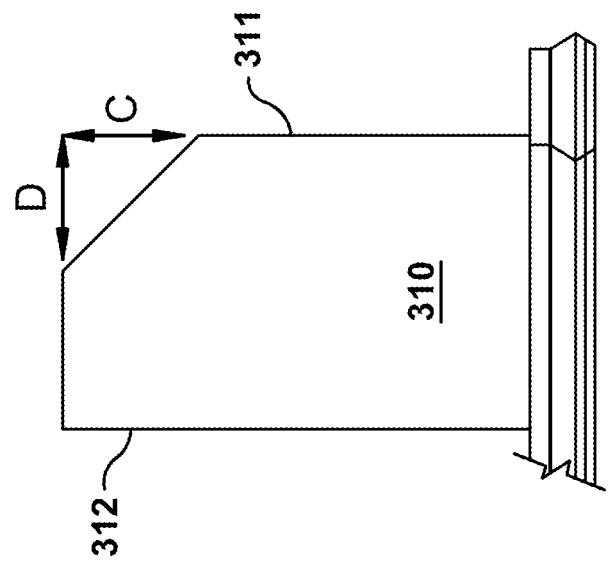
FIG. 3

APPARATUS AND METHOD FOR SERVICING DYNAMOELECTRIC MACHINE COMPONENTS IN-SITU

BACKGROUND OF THE INVENTION

The apparatus described herein relates generally to dynamoelectric machines. More specifically, the apparatus relates to an apparatus and method for servicing or repairing dynamoelectric machine components in-situ.

Gas turbine compressor blades can get damaged due to the effects such as corrosion, rub cracks, pitting, and foreign objects. In the event of such damages, timely detection and repair of these blades are desirable to prevent tip liberation and subsequent compressor failure. The current practice for blade inspection and repair requires compressor case removal, which is inevitably time consuming and expensive. The removal of the compressor case for inspection and repair of compressor blades also creates undesirable outage time, thereby resulting in lost income for the machine owner/operator.

BRIEF DESCRIPTION OF THE INVENTION

In an aspect of the present invention, an apparatus is provided for servicing a dynamoelectric machine component. The apparatus includes a tool delivery mechanism adapted for delivering a tool to a desired location in the dynamoelectric machine, and a tool support fixture adapted to be secured onto the body of the dynamoelectric machine, where the tool support fixture can be used for supporting and adjusting the tool delivery mechanism. A sleeve mechanism is attached to the tool support fixture, and the sleeve mechanism is disposed around a portion of the tool delivery mechanism. The apparatus is adapted to service the component of the dynamoelectric machine in-situ.

In another aspect of the present invention, a method is provided for in-situ servicing or repair of dynamoelectric machine components. The method includes the steps of adjusting an orientation of inlet guide vanes, adjusting a rotor/stator clocking, orienting a tool delivery mechanism so that an end effector is substantially radially aligned with a portion of a dynamoelectric machine, moving the tool delivery mechanism into a first desired position, rotating the tool delivery mechanism into a second desired position, and manipulating a handle to move the end effector to at least one of: inspect, mark and repair a component in a dynamoelectric machine.

BRIEF DESCRIPTION OF THE DRAWINGS

FIG. 3 illustrates examples of damage to a compressor blade and the resulting repair required;

DETAILED DESCRIPTION OF THE INVENTION

The major challenge in the development of an in-situ blade inspection and repair method and apparatus is to design a mechanism that can deliver the inspection tools and the repair payloads to the target blade inside the compressor, due to the stringent spatial constraints imposed by the tight workspace within the compressor flow path. The delivery mechanism should be capable of reaching both the leading edges and the trailing edges of the target airfoil or blade (e.g., the second row of compressor rotor blades (R1) in a gas turbine).

Figure 1:
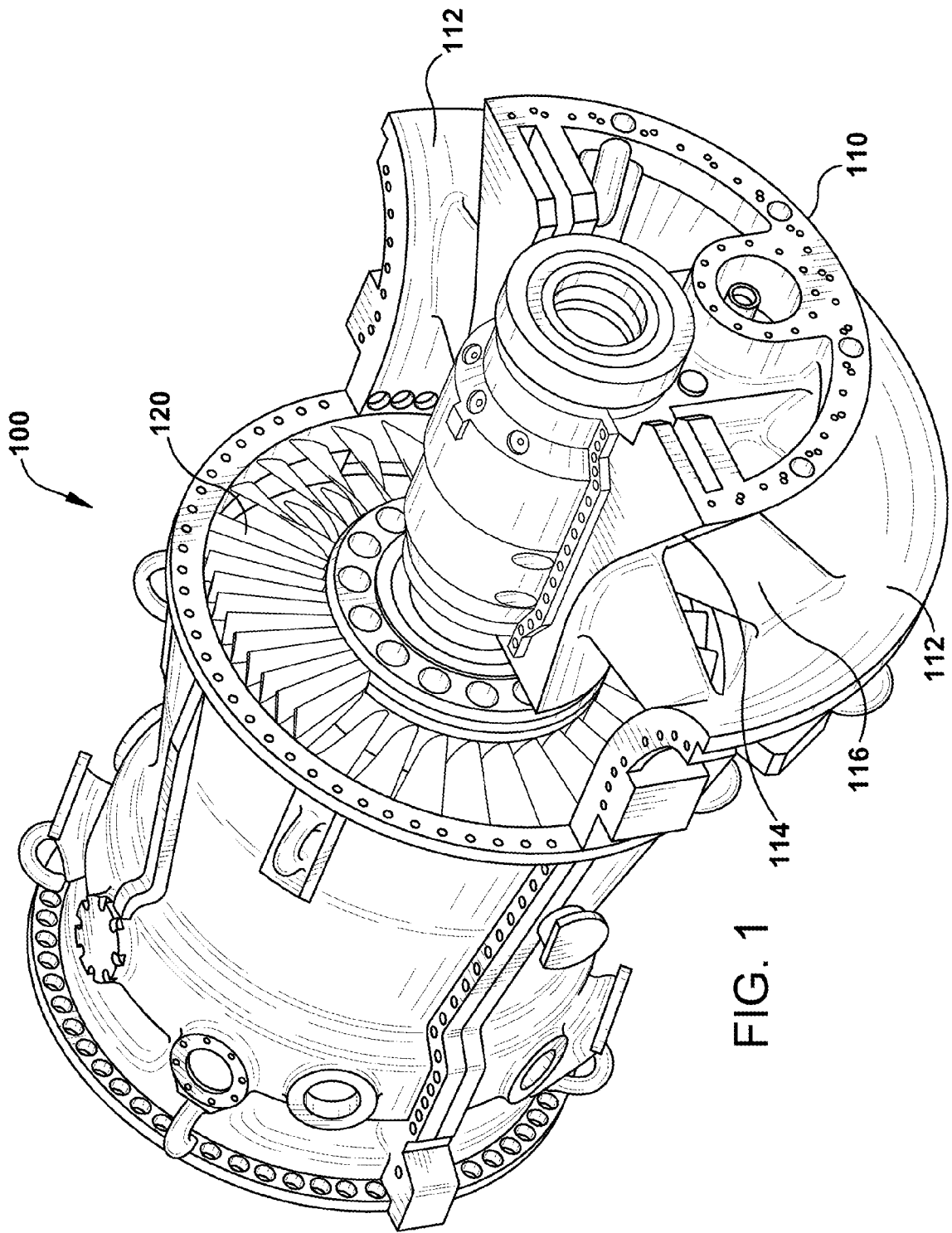
FIG. 1 illustrates a partial, cut-away view of a dynamoelectric machine.

FIG. 1 illustrates a partial, cut-away view of a dynamoelectric machine 100, which may be a gas turbine compressor. However, it is to be understood that the present invention can be applied to any dynamoelectric machine, including but not limited to, gas turbines, steam turbines, compressors, etc. In compressor 100 half of the compressor bell mouth 110 is omitted to show the vanes and blades inside. The first stage of stator vanes is called inlet guide vanes (IGVs) 120. The bell mouth 110 includes an outer surface 112 and an inner surface 114, and incoming flow passes between these two surfaces. Typically, a plurality of support members 116 are fastened or welded to the outer surface 112 and the inner surface 114 for support.

Figure 2:
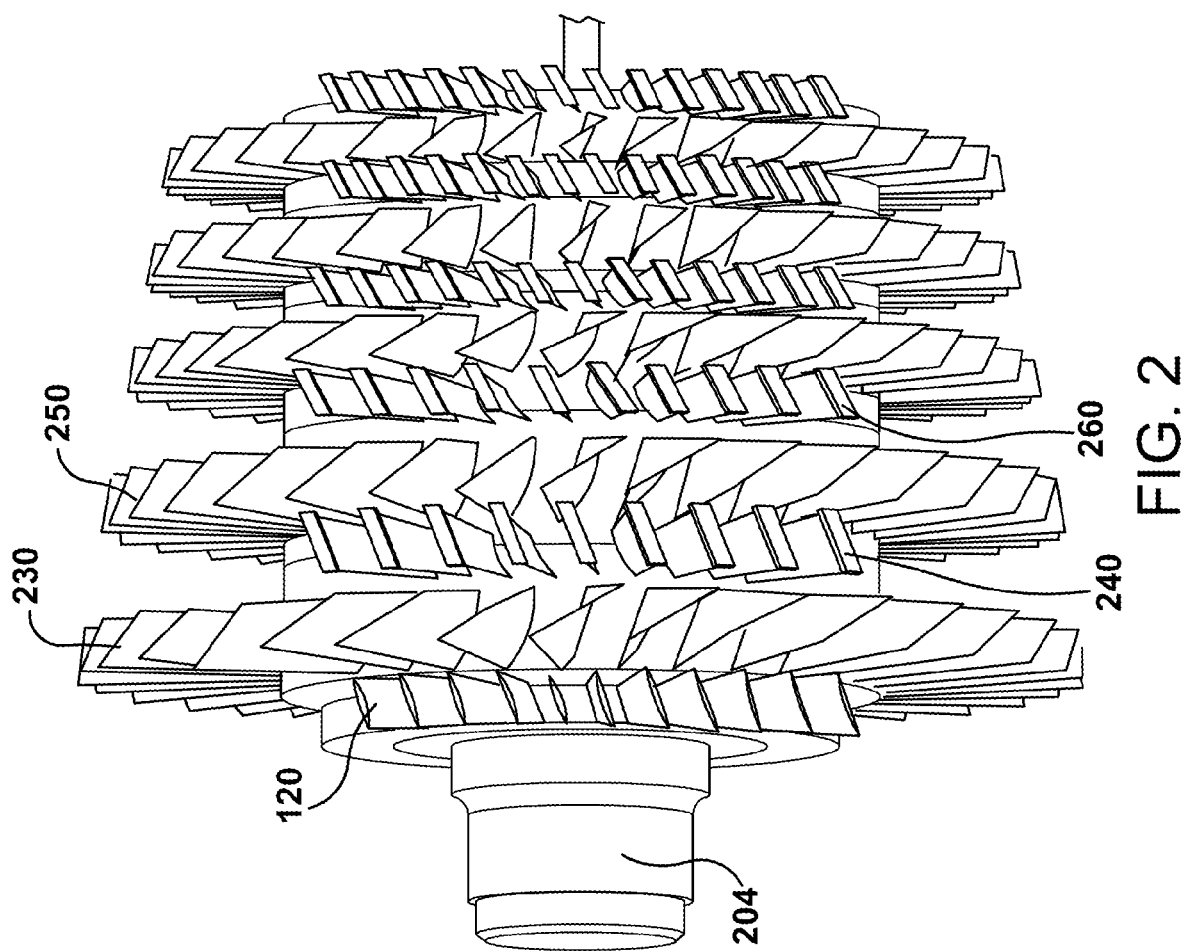
FIG. 2 illustrates a partial perspective view of a compressor showing the airfoils and vanes.

FIG. 2 illustrates a partial perspective view of the compressor airfoils and vanes, with the casing omitted for clarity. The stator vanes are generally fixed, while the rotor airfoils/blades are connected to rotatable rotor 204. The inlet guide vanes 120 are generally fixed as well, but may pitch around a radial axis to vary the direction or amount of incoming flow. The inlet guide vanes 120 are followed by a first row of rotor airfoils 230. The airfoils can also be referred to as the R0 airfoils or blades, as they are part of the R0 stage. The stator vanes 240 are next, and can also be referred to as the S0 vanes, as they are part of the S0 stage. The next row of rotor airfoils/ blades 250 can be referred to as the R1 airfoils or blades, as they are part of the R1 stage. The R1 airfoils are followed by the S1 stator vanes 260, as they are part of the S1 stage, and so on.

It would be desirable if a delivery mechanism could go through the bell mouth 110 and reach the target blade or vane, as well as deliver a complete tool set to perform the desired repair operation. As one example only, an R1 blade can experience various types of damage and this blade could be reached without requiring case removal, according to an aspect of the present invention.

FIG. 3 illustrates a few examples of damage to an R1 blade and the resulting repair required. The damage could be caused by corrosion, cracks, and/or pitting, as just a few examples. Therefore, according to the damages that typically occur to an R1 blade, three types of blending operations are identified and defined as shown in FIG. 3. Blade 310 illustrates a Type 1 blend, where a portion of the blade tip is removed. In this example, the maximum amount of D is equal to half of the chord length (CL), and the maximum amount of C is equal to one third of the blade length (BL). Blade 320 illustrates a Type 2 blend, where a maximum amount of E×F is equal to a predetermined amount and R is equal to a corner radius of about 0.25". Blade 330 illustrates an edge blend, where A is greater than five times the distance of X (the chord depth of the damage). Accordingly, any specific amount and/or distance can be used as desired in the specific application, and the values given previously are merely exemplary. In addition, the Type 1, Type 2 and Type 3 blends may be located on the blade leading edge 311 and/or trailing edge 312.

Figure 4:
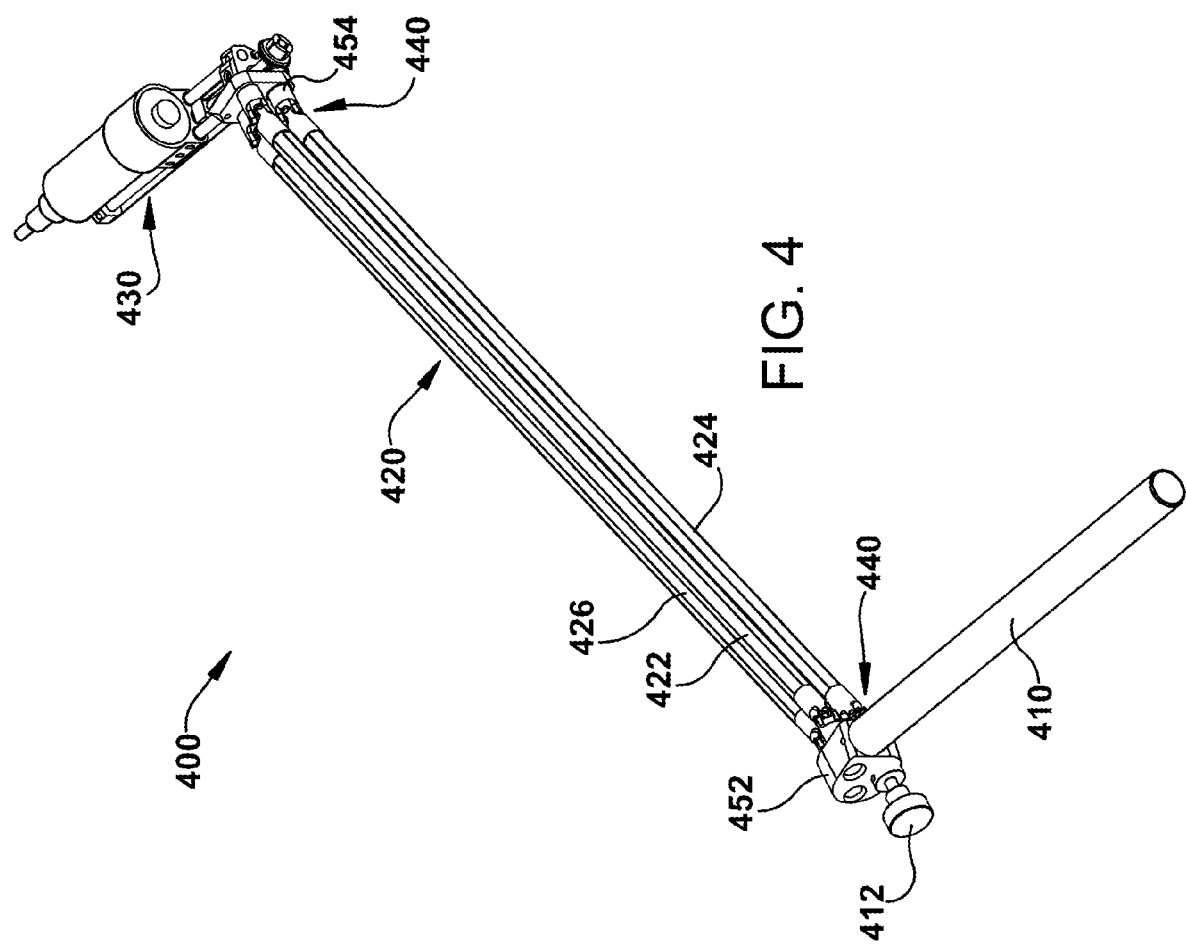
FIG. 4 illustrates a perspective view of a tool delivery mechanism that may be used to deliver a repair tool, according to an aspect of the present invention.

FIG. 4 illustrates a perspective view of a tool delivery mechanism 400 that may be used to deliver a repair tool (e.g., a grinder) into a turbine or compressor to reach the target blade or vane. As described earlier, a major challenge in the design of the tool delivery mechanism 400 is due to the stringent spatial constraints imposed by the tight workspace within the turbine or compressor flow path. In addition, there are an infinite number of possible clocking configurations of the first few rows of compressor blades/vanes, due to two uncertainties in clocking between different rows of blades/ vanes. In particular, the clocking between the rotor and the stator can be arbitrary and the clocking between the $1^{st}$ stage and the $2^{nd}$ stage of rotor blades can be very different from one unit of a dynamoelectric machine to another. As the rotor/ stator clocking is tunable (i.e., the rotor airfoils/blades can be turned relative to the stationary stator vanes), it can be strategically adjusted to facilitate the ingress/egress of the tool delivery mechanism 400, whereas the multiple rotor stage (e.g., R0/R1) clocking is fixed and therefore not controllable as it varies from one machine to another machine. The tool delivery mechanism 400 is thus designed to be capable of accomplishing all the three types of blends on airfoils, blades and vanes in various stages with various clocking settings or arrangements.

The tool delivery mechanism 400 includes a three-link mechanism that has been specifically designed to facilitate tool delivery. The tool delivery mechanism 400 includes a handle 410, a middle link 420 which includes a plurality of rods including a first rod 422, a rotary rod 424 and a third rod 426, and an end effector 430. A universal joint 440 is attached to each end of the first rod 422, rotary rod 424 and third rod 426. Thus six universal joints 440 may be employed in the tool delivery mechanism 400. The three rods 422, 424, 426 with universal joints 440 at both ends are then assembled substantially parallel to each other to two end plates 452, 454. The handle 410 is attached to end plate 452, and the end effector 430 is attached to end plate 454. The terms "joint" or "joints" may be defined to include a universal joint and/or a ball joint, and universal joints and/or ball joints, respectively.

When one rod is fixed (e.g., first rod 422), the tool delivery mechanism 400 is capable of providing 2-degree of freedom (DOF) motions to the end effector 430. The three link mechanism consists of five independent links (handle 410, end effector 430, and three rods 422, 424, 426) and six universal joints 440. The motion capability of the tool delivery mechanism 400 can be calculated using Gruebler's equation. However, due to the redundant constraints inherent in this mechanism, the DOF calculation is not obvious. As each rigid object in a three dimensional (3D) space has 6 independent DOFs, the total number of DOF of the 5 bodies in the mechanism is 6×5=30. When one of the 5 bodies is fixed (e.g., the first rod 422), the remaining DOFs is 6(5−1)=24. Each joint will add a number of constraints to the mechanism and thus eliminate the same number of DOFs. Since a universal joint only permits two rotational motions, it adds 4 constraints to the mechanism. Therefore the total number of constraints added is 6×4=24. Therefore the number of DOFs allowed by the 3-link mechanism is equal to 24−24=0. DOF of zero means the mechanism cannot move. However, when one rod is fixed (e.g., first rod 422), the number of DOFs of the tool delivery mechanism 400 is 2. The difference comes from the two redundant constraints that were not considered in the calculation.

In order to understand the two redundant constraints, it is helpful to consider the scenario that two universal joints at the end effector 430 side attached to the rotary rod 424 and the third rod 426 are replaced by ball joints. In other words, there are four universal joints and two ball joints in the mechanism. Each universal joint 440 restricts four DOFs and allows two, whereas each ball joint restricts three DOFs and allows three. Therefore, in this configuration, the total number of DOFs allowed by the mechanism can be calculated by Gruebler's equation as 6×(5−1)−(4×4)−(2×3)=2. In particular, the two DOFs are the roll and yaw motions of the end effector. When the two ball joints are replaced by universal joints, it can be easily seen that the two universal joints can only be assembled in a specific orientation. Otherwise, it would be impossible to assemble the mechanism unless the rods can be twisted. Therefore, the two more constraints introduced by replacing two ball joints by two universal joints are redundant. The number of DOFs allowed by the 3-link mechanism is thus equal to 2. As one example alternative, the two universal joints could be replaced by ball joints. However, the usage of universal joints rather than ball joints on the non-fixed rods enables the transmission of a rotary motion from the user side to the end effector through a rod. Both rods that are not fixed can be employed for such transmission. In a following example one of the remaining two rods may be configured to be rotatable, and the rotary motion is employed to drive a linear sliding motion of the end effector. Therefore, of the plurality of rods, only one may need to be fixed. The rest can be configured to be rotatable without affecting the original mechanism while providing transmission of actuation from the user side to the end effector. In this way, actuators can be put on the user side for ease of operation, and the size of the end effector can be reduced to work in the tight workspace inside a dynamoelectric machine.

Figure 5:
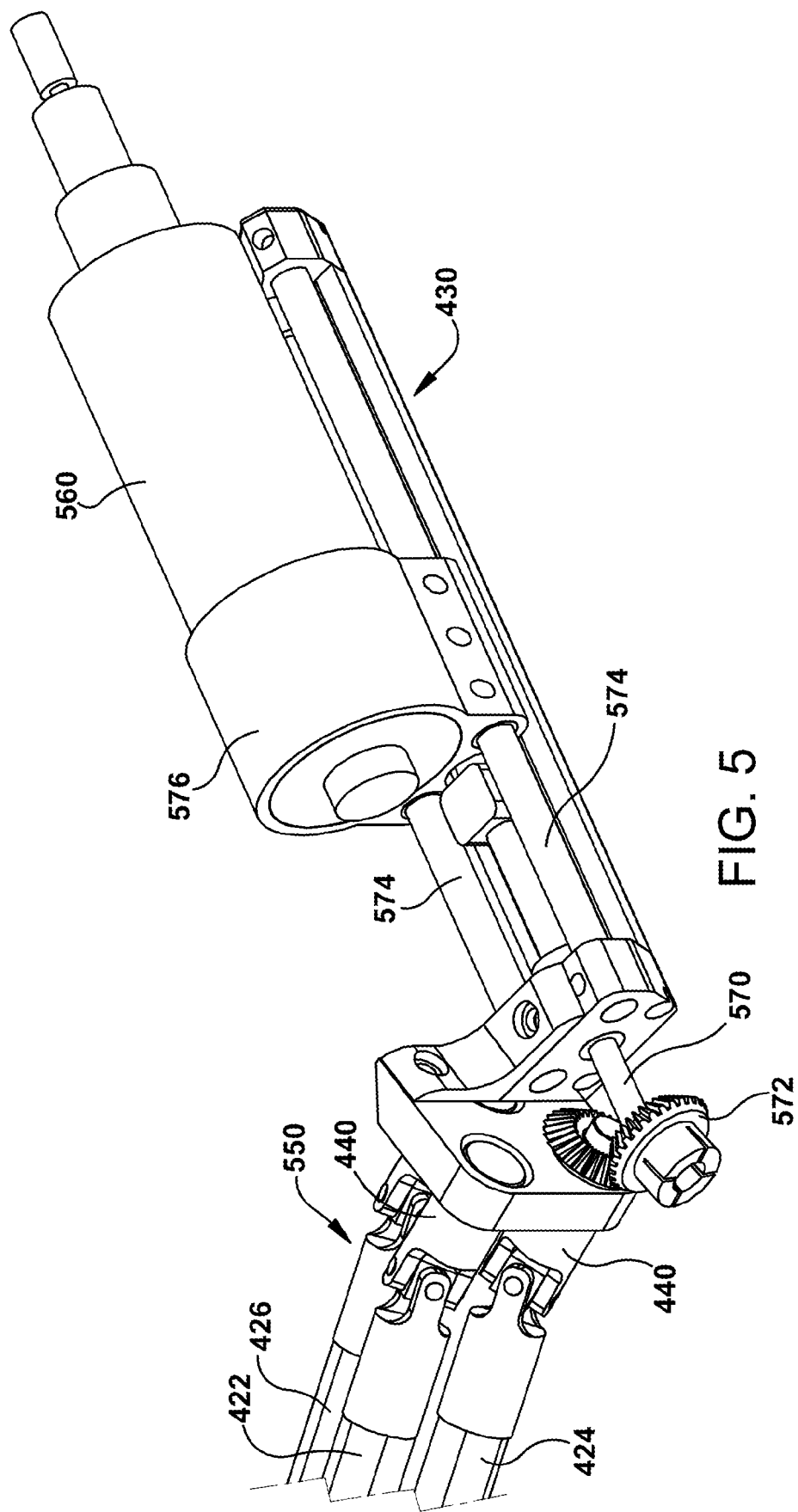
FIG. 5 illustrates an enlarged perspective view of the end effector end of the tool delivery mechanism of FIG. 4, according to an aspect of the present invention.

FIG. 5 illustrates an enlarged perspective view of the end effector end of the tool delivery mechanism 400. The motions of the end effector 430 move about a common pivot point 550. The rotational pivot point 550 of the end effector 430 is located at the pivot of the universal joint 440 attached to the fixed rod 422 at the end effector side. The handle 410 also rotates about its pivot point, which is located at the pivot of the universal joint attached to the fixed rod 422 at the handle side of the tool delivery mechanism 400. According to the kinematics of this mechanism, the roll and yaw motions of the end effector 430 about its pivot point 550 will always copy the motion input from the handle 410. Thus the operator's action can be intuitively transmitted through the tool delivery mechanism 400 to the end effector 430 for the repair.

In addition, the end effector 430 may be configured to provide a linear back-and-forth sliding motion to the tool 560. The tool 560 may comprise a grinder (as shown), sander, polisher, marking device, pen, or any other suitable tool that may be desired in the specific application. The sliding motion is the 3rd DOF motion of the tool delivery mechanism 400, in addition to the two rotational DOFs permitted by the 3-link mechanism. With the three DOFs of the tool delivery mechanism 400, the location of the tool 560 can be maneuvered in a 3D workspace to reach any point from the leading edge to the trailing edge of the target airfoil, blade or vane at any interstage (e.g., R0/R1) clocking.

The sliding motion is realized by a lead-screw mechanism that may include a trapezoidal thread screw 570 (e.g., an ACME screw). Alternatively, and suitable threaded shaft 570 could be employed, as desired in the specific application. The trapezoidal thread screw 570 is driven by a knob 412 at the operator or handle end as shown in FIG. 4. When the operator rotates the knob 412, the rotary motion is transmitted through the knob 412—universal joint 440—rotary rod 424—universal joint 440 to the bevel gears 572 and then to the trapezoidal thread screw 570, thereby moving the tool 560 back and forth along supporting shafts 574. Two supporting shafts 574 are shown connected to a tool retention clamp 576, but it is to be understood that one, three or more supporting shafts could also be employed.

The trapezoidal thread screw 570 and supporting shafts 574 are designed so that the end effector 430 has a length range suitable for the components of the desired machine, which is determined by analyzing the geometry and relative locations of the stator vanes and rotor airfoils/blades. As one example only, the length range can be about 6.5 inches to about 12 inches. The overall size of the end effector 430 is designed so that its motion range can be maximized in the constrained workspace, whereas the end effector 430 should also have adequate stiffness to withstand typical machining load. In addition, the trapezoidal thread screw 570 pitch is selected to assure that the slide is not back-drivable. In other words, vibrations and varying machining loads exerted on the tool 560 should not undesirably move the tool 560 along the supporting shafts 574.

One important feature for the mechanical design of the tool delivery mechanism 400 is that the whole system should have adequate rigidity to withstand the varying forces produced during the repair or grinding operations. For example, experience has shown that grinding forces may be up to about 30 lbf or more in all directions and within a wide spectrum (0~about 500 Hz and up). Insufficient rigidity of the system will result in chattering during grinding operation, reducing machining accuracy and maneuverability. The positioning uncertainty at the end of the grinding head should be less than a predetermined distance at a nominal 30 lbf machining load to assure machining accuracy. In the ideal case, the location of the grinder head should be solely determined by the orientation of the handle 410 and the length of the screw 570 and supporting shafts 574 at the end effector 430. However, due to the flexibility of each mechanical component in the tool delivery mechanism 400, and the backlashes in the joints, including both the universal joints 440 and the prismatic joint of the end effector 430, the tool head location may vary under machining loads even though the operator does not intend to vary it. Therefore component stiffness and joint backlashes are important considerations in designing and implementing the tool delivery mechanism 400.

According to aspects of the present invention, there are several approaches that can be employed to improve the rigidity of the tool delivery mechanism 400. For example, the three rods 422, 424, 426 could be tied together with compressing rings (e.g., tie wraps). These compressing rings hold the rods together while allowing relative sliding motion between them. This arrangement distributes the machining load over all three rods 422, 424, 426, and thus greatly increases the stiffness of the cantilever support structure.

A pair of anti-backlash bevel gears or miter bevel gears 572 may also be employed to transfer the rotary motion input from the operator to the end effector 430 to drive the tool 560 along the supporting shafts 574. The shaft angle between the bevel gears 572 may be selected to be about 105°. Thus in nominal condition, the angle between the end effector 430 and the middle link is about 105°. In general the universal joints have an angular motion range of about 30°. Thus the angular motion range for the end effector 430 in the plane of the tool delivery mechanism 400 is about 75° to about 135°. The 105° angle is determined by matching the ±30° motion range of the end effector allowed by the universal joints with the available space in the dynamoelectric machine, e.g., a compressor.

Figure 6:
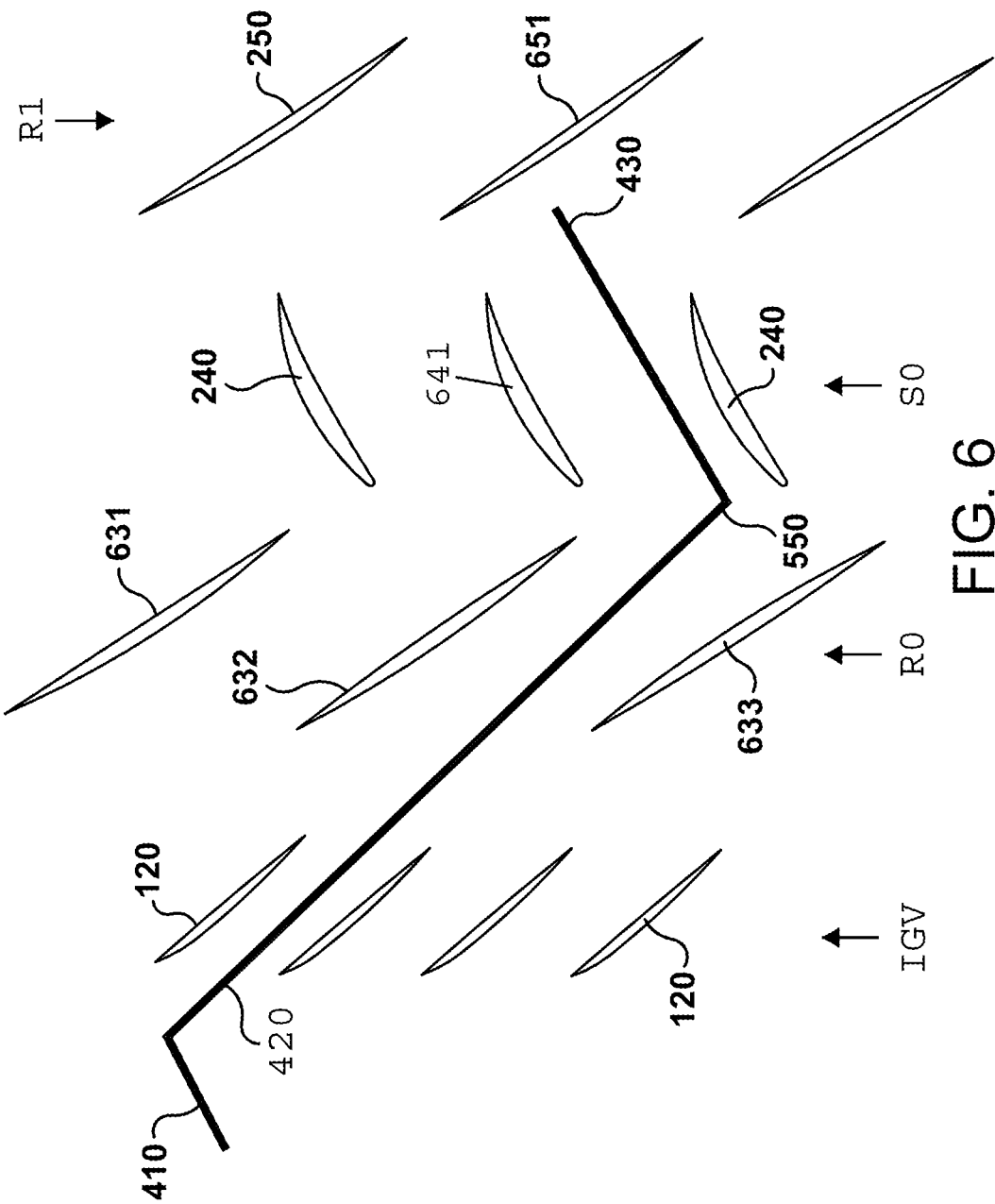
FIG. 6 illustrates a schematic view of the tool delivery mechanism navigating through various rotor and stator stages in a compressor, according to an aspect of the present invention.

According to an aspect of the present invention, and referring to FIG. 6, a method is provided to insert the tool delivery mechanism inside a dynamoelectric machine, e.g., a compressor, for repairing a part in the dynamoelectric machine. A first step can include adjusting the inlet guide vane 120 orientation, and this step may be followed or preceded by adjusting the rotor/stator clocking to facilitate the ingress/egress of the tool delivery mechanism 400. In order to insert the tool delivery mechanism 400 into the compressor 100 and perform the servicing/repair operation, the inlet guide vanes 120 may be oriented so that they are about parallel to the R0 blades 230. The relative clocking of rotor and stator may be adjusted so that the trailing edge, in this example, of the associated R0 blade 632 is in close proximity to the leading edge of an S0 vane 641. The associated R0 blade 632 is the blade that the target R1 blade 651 is circumferentially clocked in between the R0 blade 631 and the next R0 blade 633 in clockwise direction. After the associated R0 blade 632 is identified and its trailing edge is aligned with the leading edge of S0 vane 641, there will be two full openings at the S0 stage available for the insertion of the tool delivery mechanism 400.

During the insertion of the tool delivery mechanism 400, the 3-link mechanism is first oriented so that the end effector 430 is substantially radially aligned with the compressor and the middle link 420 is substantially parallel to the IGVs. To be more specific, the end effector 430 will be pointing substantially out of the page as in the view of FIG. 6. Then the tool delivery mechanism 400 can slide easily into the compressor until it reaches the desired position (e.g., the S0 or R1 stage). Then the tool delivery mechanism 400 can be rotated about 90 degrees and be placed in the configuration as shown in FIG. 6.

A method according to an aspect of the present invention may include the steps of orienting a tool delivery mechanism so that an end effector is substantially radially aligned with a portion of a dynamoelectric machine, moving the tool delivery mechanism into a first desired position, rotating the tool delivery mechanism into a second desired position, and manipulating a handle to move the end effector to at least one of: inspect, mark and repair a component in a dynamoelectric machine. The above method can also include orienting a middle link of the tool delivery mechanism so that the middle link is substantially parallel to inlet guide vanes, and subsequently moving the end effector into position near at least one of: an S0 vane, an S1 vane, an R0 blade and an R1 blade.

Figure 7:
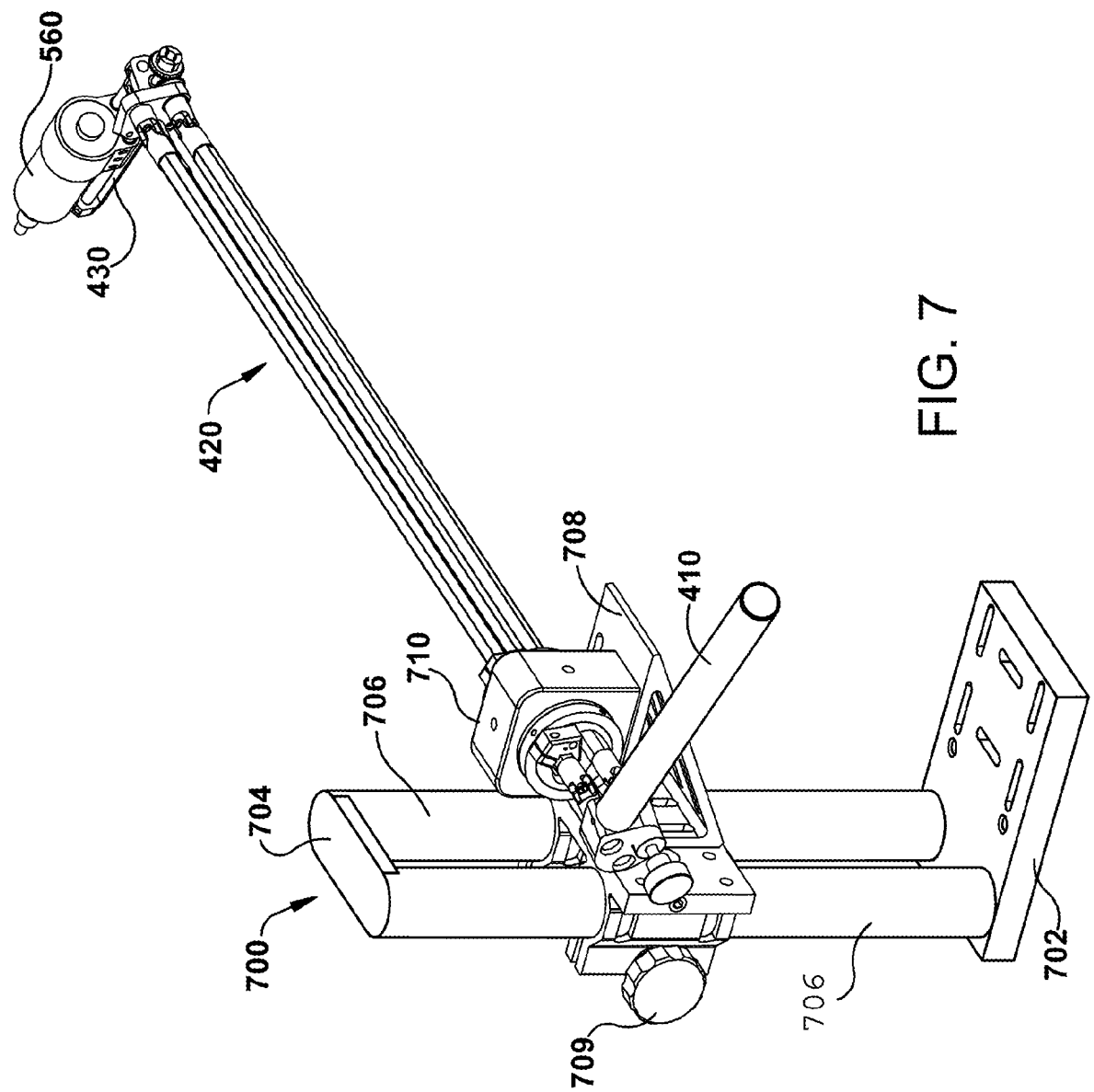
FIG. 7 illustrates a perspective view of a tool support fixture that can be attached to or secured onto the body of a dynamoelectric machine, according to an aspect of the present invention.

FIG. 7 illustrates a perspective view of a tool support fixture 700 that can be attached to or secured onto the body of the compressor 100, just outside of inlet guide vanes 120, according to an aspect of the present invention. The tool support fixture 700 serves as a supporting base for the tool delivery mechanism 400. The tool support fixture includes a bottom mount 702, a top mount 704, one or more vertical support members 706 connected to the bottom mount 702 and the top mount 704, and a bracket 708 for supporting the sleeve mechanism 710. The bracket 708, and therefore the sleeve mechanism 710 and tool delivery mechanism 400, can be moved vertically along the vertical support members 706 and locked in place by the use of one or more set screws 709.

The sleeve mechanism 710 accomplishes various functions, including permitting the rotary motion of the three rods about their common central axis. Specifically, as of this DOF, the middle link 420 stays in place while the handle 410 and the end effector 430 tilt towards different directions. In other words, this motion generates the pitch motion of the end effector 430. This additional DOF may be used to reach the very top edge of the blade or vane, because in some machines the body of the tool 560 may contact the inside casing of the compressor 100 before the tool tip or head reaches the very top of the target blade or vane. With the rotary motion permitted by the sleeve mechanism 710 the end effector 430 may be tilted up by a desired angle to avoid mechanical conflict between the tool body/head and the compressor casing.

Figure 8:
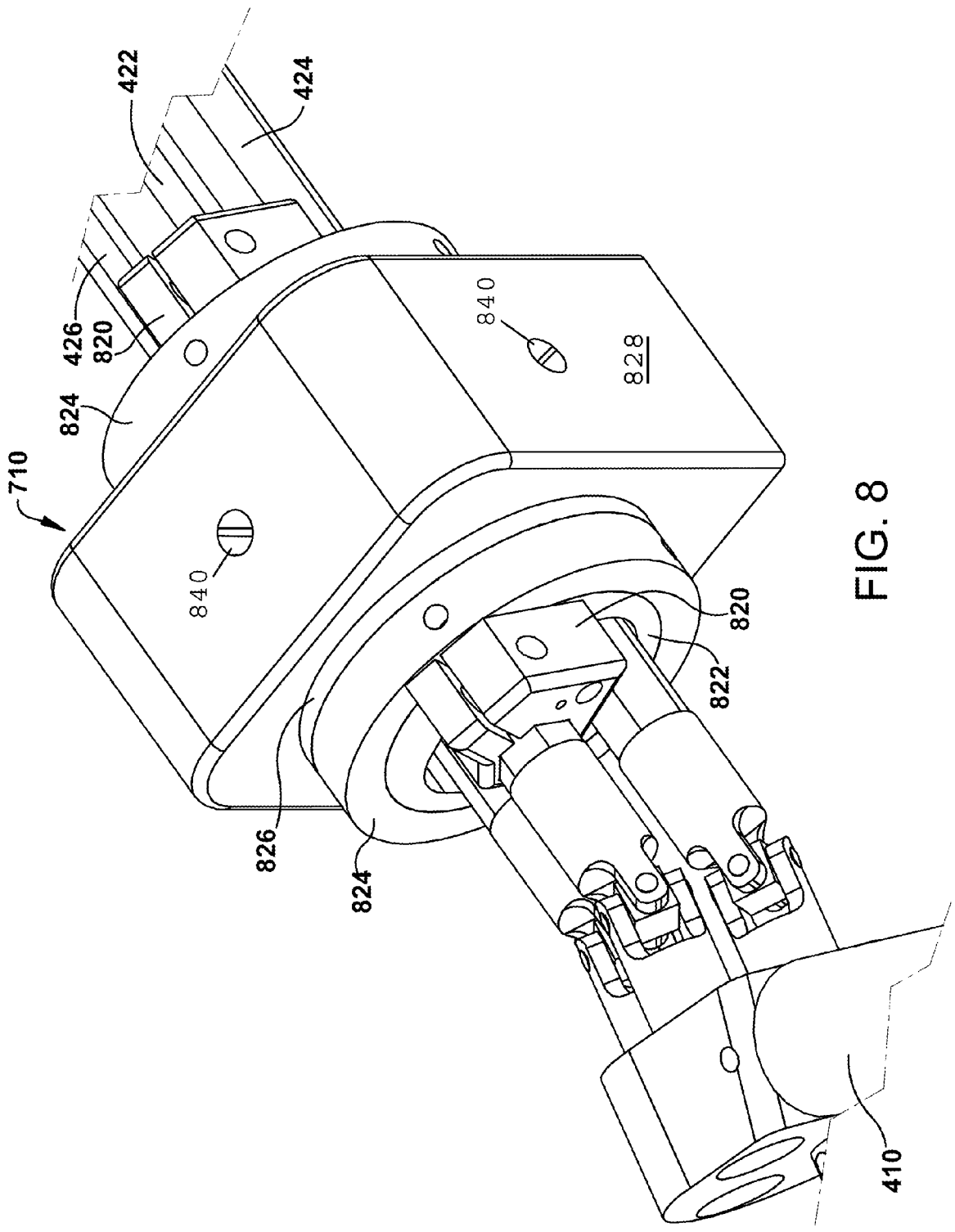
FIG. 8 illustrates an enlarged perspective view of the sleeve mechanism, according to an aspect of the present invention.
Figure 9:
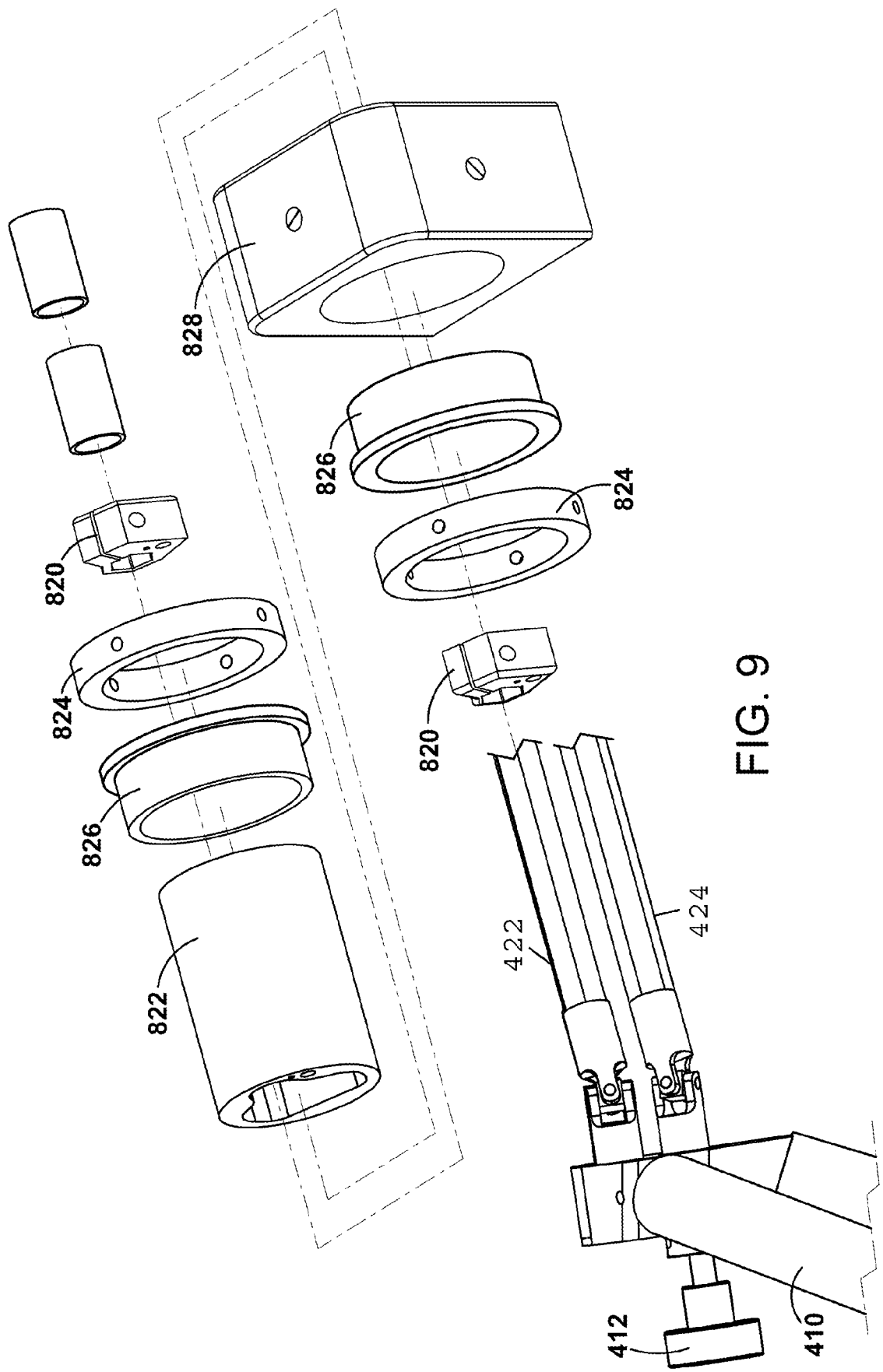
FIG. 9 illustrates an exploded view of the sleeve mechanism of FIG. 8, according to an aspect of the present invention.

FIG. 8 illustrates an enlarged perspective view of the sleeve mechanism 710, and FIG. 9 illustrates an exploded view of the sleeve mechanism 710. Two clamps 820 tightly hold the first and fixed rod 422, and then both clamps 820 are fixed to a sleeve 822 part that goes around the three rods 422, 424, 426. Two shaft collars 824, two flanged bearings 826, and a holder body 828 are then assembled onto the sleeve 822 to enable the rotary motion between the three rods 422, 424, 426 and the holder body 828. Essentially the sleeve 822 creates a shafting surface, allowing the bearings 826 and the holder body 828 to be assembled. There may be three set screws 840 assembled onto the holder body 828, and the set screws 840 are employed to fix the sleeve mechanism and lock the relative motion between the holder body 828 and the sleeve 822.

The sleeve mechanism 710 also enables the second DOF motion that is accomplished by the tool support fixture 700. When the two clamps 820 do not tightly hold the first rod 422, the middle link 420 can slide back and forth with respect to the holder body 710. This motion greatly facilitates the ingress and egress of the tool delivery mechanism 400 relating to the compressor or dynamoelectric machine. It could also be used to fine tune the pivot location 550 of the tool delivery mechanism 400, so that the end effector 430 can be put in the desired configuration or location for the required repair operation.

Figure 10:
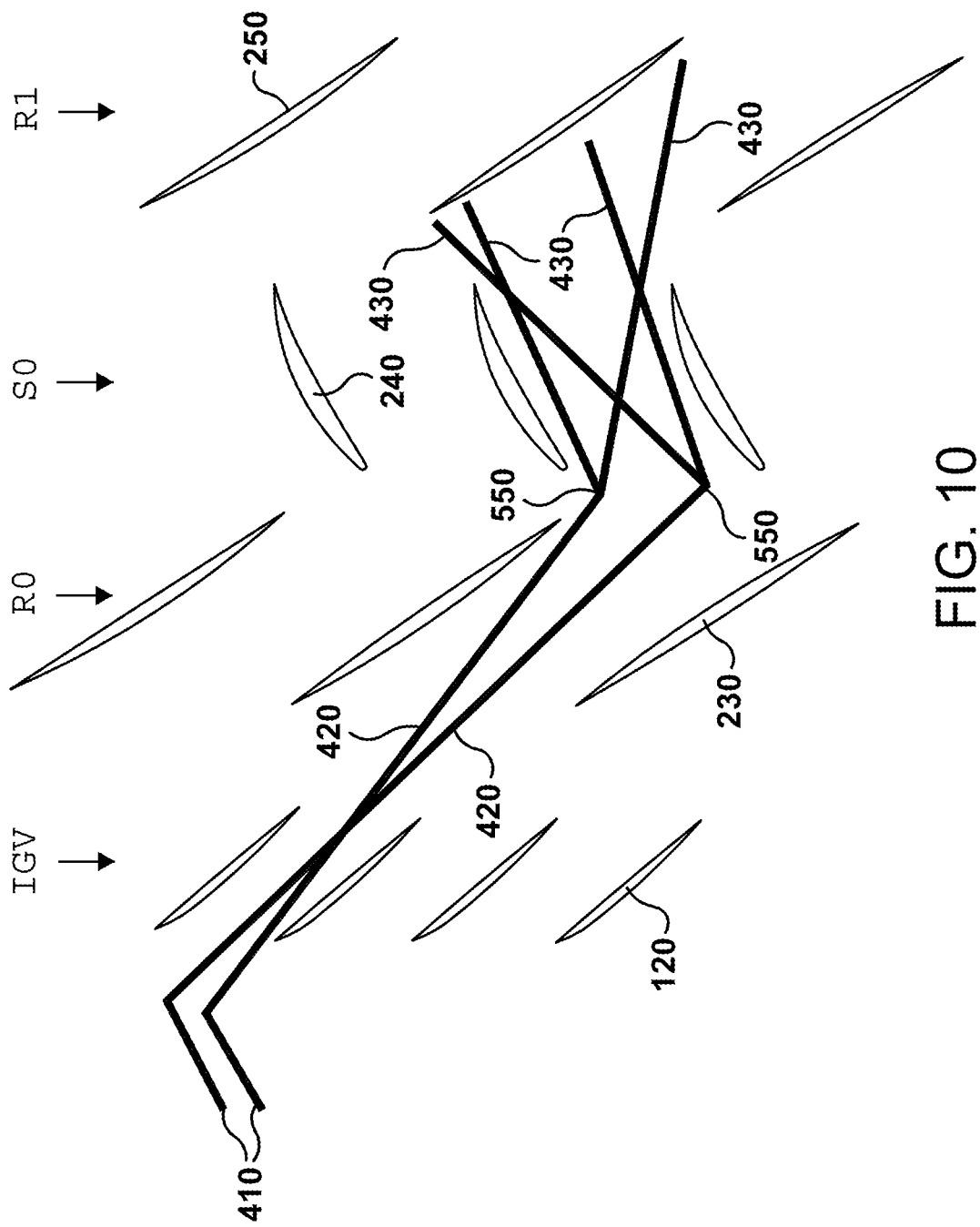
FIG. 10 illustrates a schematic view of the tool delivery mechanism navigating through various rotor and stator stages in a dynamoelectric machine, as well as the yaw motion range of the end effector according to its location relative to the airfoils and vanes, according to an aspect of the present invention.

FIG. 10 illustrates a schematic view of the tool delivery mechanism 400 navigating through various rotor and stator stages in a compressor to reach an R1 blade, according to an aspect of the present invention. FIG. 10 also shows the workspace allowed by the delivery mechanism inside the dynamoelectric machine. It should be noted that the exact location of the pivot relative to the S0 vanes determines the in-plane angular motion range of the end effector, hence the machining range on the target R1 blade. The multiple configurations of the tool delivery mechanism 400 as shown illustrate the relationship between the in-plane angular range of the end effector and the location of the pivot relative to the S0 vanes. The rotary motion introduced by the sleeve mechanism 710 will not significantly change the pivot location. The in-and-out motion allowed by the clamps 820 only moves the pivot location along the compressor flow path. To move the pivot circumferentially inside the compressor, an adjustment mechanism may be employed and assembled between the tool support fixture 700 and the sleeve mechanism 710.

Figure 11:
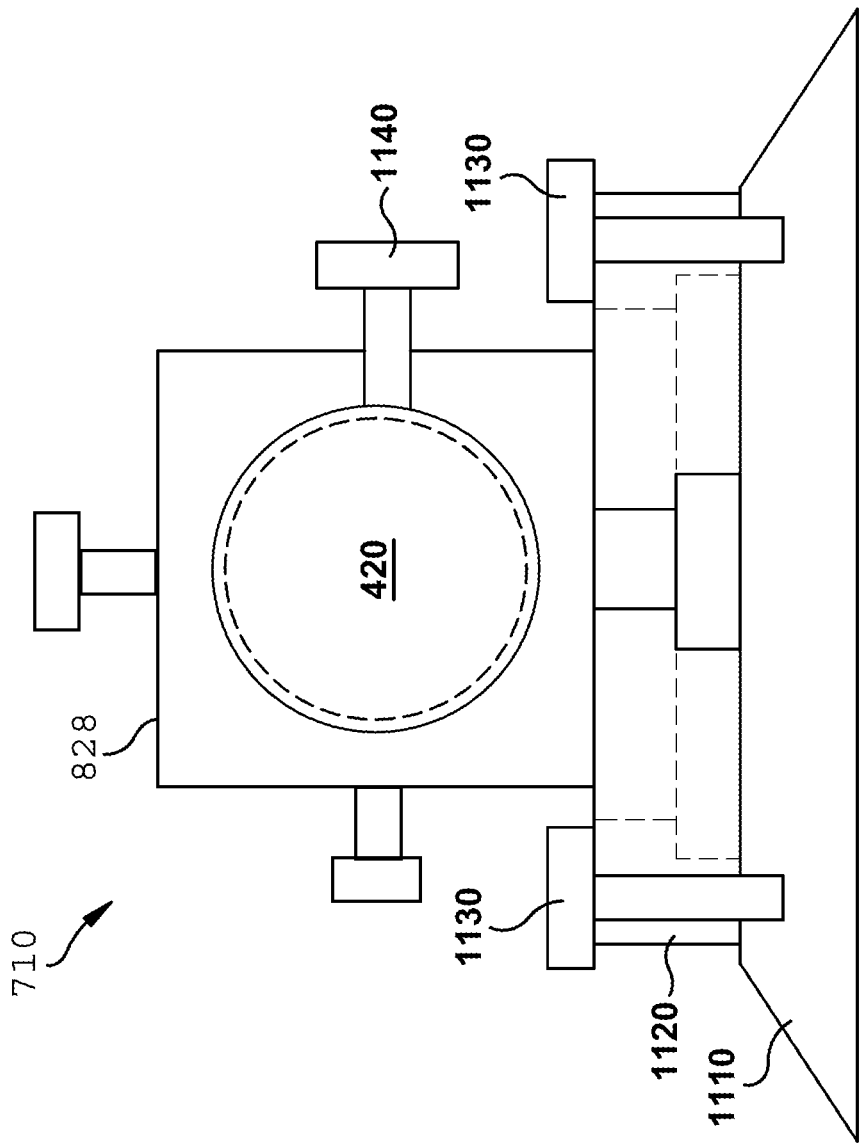
FIG. 11 illustrates a cross-sectional view of the sleeve mechanism and an adjustment mechanism, according to an aspect of the present invention.

FIG. 11 illustrates a cross-sectional view of the sleeve mechanism 710 and the adjustment mechanism 1110, 1120, according to an aspect of the present invention. The holder 828 in the sleeve mechanism 710 may be fixed to a dovetail shaped base 1110 through an adaptor mount 1120 in between. The dovetail shaped base 1110 and the adaptor mount 1120 together form an adjustment mechanism. The adaptor mount 1120 has a counterbore slot which allows the holder 828 to slide horizontally and rotate about the vertical axis, when the two screws 1130 at each side are not tightly fastened. The sliding and rotational motions of the holder 828 will be transferred to the displacement of the rods, and therefore the location of the pivot will be adjusted accordingly. The locking screw 1140 may be used to lock the middle link 420 in a desired orientation. The screws 1130 can also be used to fix the adaptor mount 1120 on the dovetail shaped base 1110.

Figure 12:
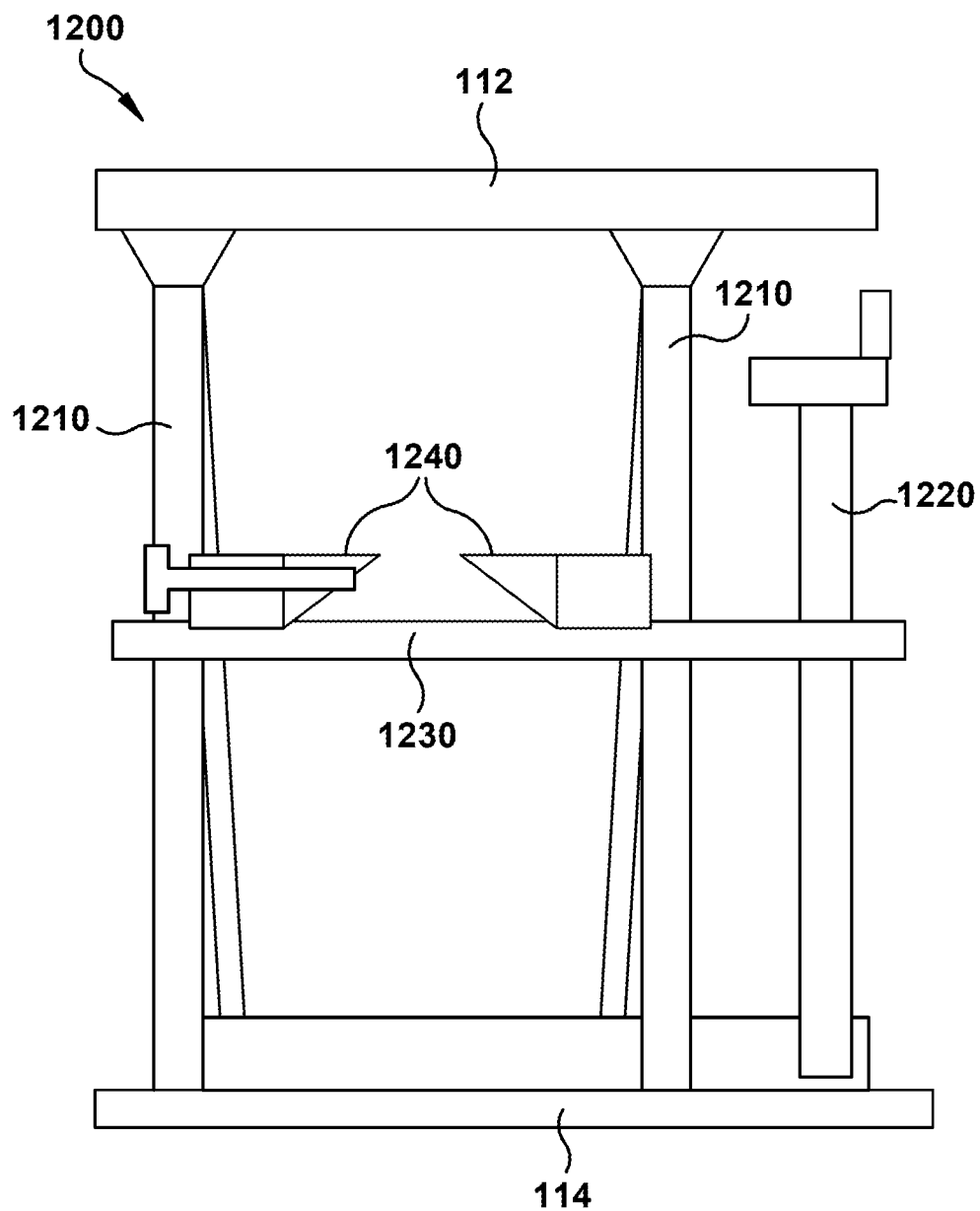
FIG. 12 illustrates a cross-sectional view of an alternate tool support fixture that compromises a linear motion stage, according to an aspect of the present invention.

The tool support fixture 700 may also provide adjustment of the whole mechanism along the radial direction of the compressor, according to an aspect of the present invention. In other words, the whole mechanism can be adjusted along the direction of the leading/trailing edges of the blades. This function is realized using a "vertical" linear motion stage 1200, as shown in FIG. 12. With the additional range of the linear motion stage 1200, the tool head will be able to reach from the top to the root of the target blade, airfoil or vane.

FIG. 12 illustrates a cross-sectional view of a tool support fixture that compromises the linear motion stage 1200. The sleeve mechanism 710 and the adjustment mechanism, as illustrated in FIG. 11, may be attached to the linear motion stage 1200. The linear motion stage can be mounted between the inner surface 114 of the bell mouth 110 and the outer surface 112 of the bell mouth 110. In other variations, the linear motion stage could be mounted between the compressor case and the compressor hub. Vertical members 1210 are vertically adjustable and function to securely support the linear motion stage between the inner surface 114 and outer surface 112. The lengths of the vertical members 1210 are adjustable so that the pushing force can be controlled as desired. The mating surfaces may be curved to match the existing surface profile of the bell mouth or compressor surfaces. The minimum horizontal distance between the two vertical members 1210 can be larger than the opening between two adjacent inlet guide vanes 120. A lead-screw 1220 may be employed to change the vertical location of the mounting plate 1230, on which the sleeve mechanism 710 and the adjustment mechanism shown in FIG. 11 are assembled using a dovetail mount 1240.

Figure 13:
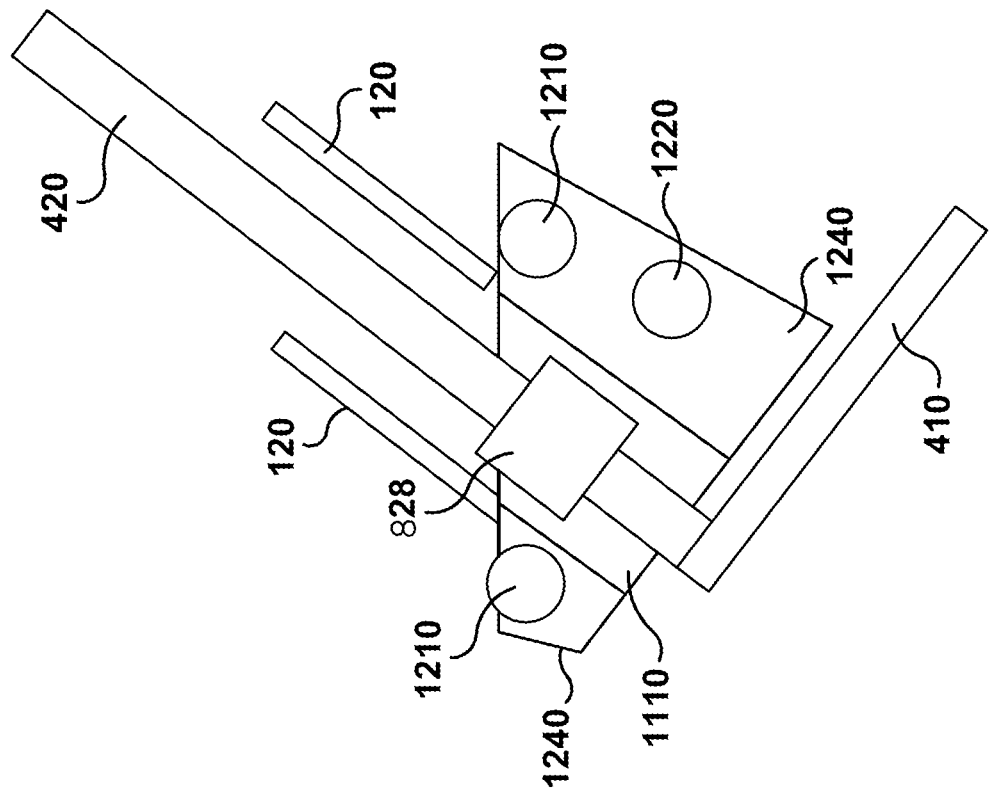
FIG. 13 illustrates a simplified top view of the tool delivery mechanism mounted in the sleeve mechanism, and where both of these are mounted in the tool support fixture, according to an aspect of the present invention.

FIG. 13 illustrates a simplified top view of the tool delivery mechanism 400 mounted in the sleeve mechanism 710, and where both of these are mounted in the linear motion stage 1200. As described previously, the tool delivery mechanism 400 includes the middle link 420 and handle 410. The middle link 420 passes through the sleeve mechanism 710. The holder of the sleeve mechanism is mounted to dovetail shaped base 1110, and the dovetail shaped base 1110 is inserted into complementary shaped dovetail mount 1240. With this arrangement, the tool delivery mechanism 400 is securely mounted and an operator can manipulate handle 410 to perform repair, inspection or marking operations on the desired airfoils, blades or vanes.

Figure 14:
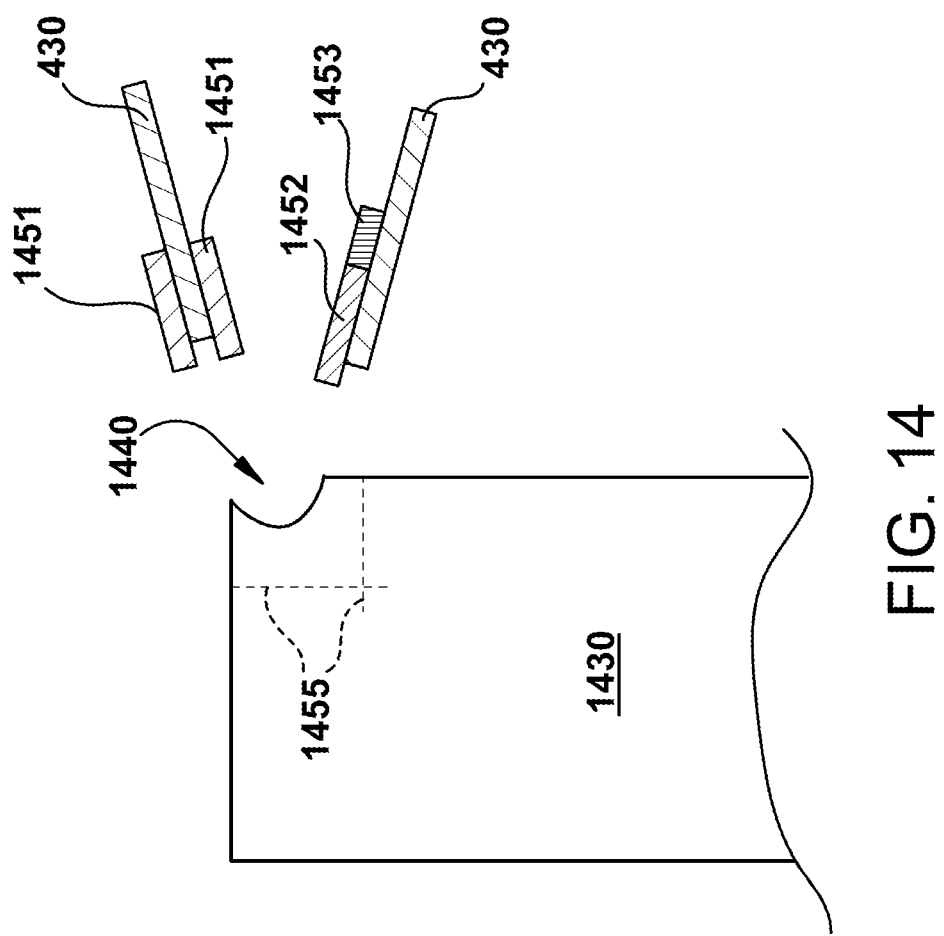
FIG. 14 illustrates a partial and simplified view of a damaged blade, and various attachments for the end effector, according to aspects of the present invention.

FIG. 14 illustrates a partial and simplified view of a blade 1430 having damage. The damaged region 1440 needs to be repaired and the tool delivery mechanism can be used to identify, mark and repair the blade 1430. One or more imaging devices 1451 can be mounted to the end effector 430 and used to identify the damaged region 1440. The imaging device 1451 can be a visual or infrared camera, a non-visual (e.g., X-ray, microwave, or eddy current) imaging device, or an ultrasonic imaging device. After the damaged region 1440 is identified, the end effector 430 can be equipped with a marking device 1452 to mark indicia or lines indicating the desired repair. The marking device 1452 can be a marker, such as a pen, permanent marker, pencil, or other ink or paint applicator device. A spring biased mount 1453 may be attached to the marking device 1452 and the end effector 430, and the spring biased mount 1453 allows the tip of the marking device 1452 to follow the contours of the blade 1430. As one example, the marking device (e.g., a permanent marker) can be used to draw repair lines 1455 on the blade 1430. In this example a Type 2 blend is desired and indicated by lines 1455. Subsequently, the marking device 1452 can be removed and a tool, such as a grinder, can be attached to the end effector 430 and the grinder can be used to remove the blade material bounded by lines 1455.

Figure 15:
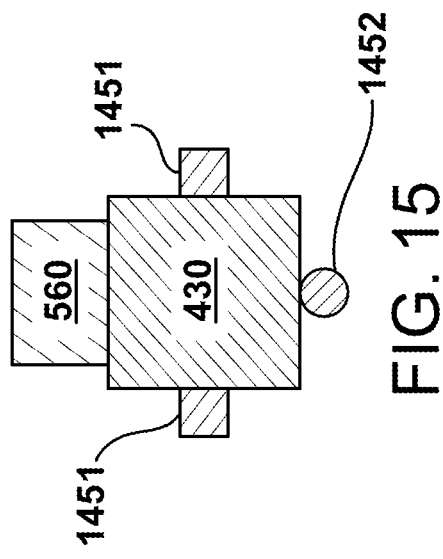
FIG. 15 illustrates a simplified schematic view of the end effector having multiple attachments.

FIG. 15 illustrates a simplified schematic view of the end effector 430 having multiple attachments. The imaging devices 1451 can be mounted to the end effector 430 so that other devices may also be mounted at the same time. For example, the imaging devices 1451 can be used to monitor a marking or repair process. In these instances the imaging devices 1451, the marking device 1452 and/or the tool 560 could be attached to the end effector 430. When marking, the imaging devices 1451 can be used to visually observe the lines as they are made. When grinding, the imaging devices 1451 can be used to monitor and view the repair process in real-time. Two or more imaging devices 1451 can be used to obtain a stereoscopic or 3D view of the desired area. As an additional aspect of the present invention, multiple imaging devices can be deployed to view various portions of the work area (e.g., the front, back and side of a blade undergoing a repair). Further, light sources (not shown) may also be deployed in the work area and/or attached to the end effector to aid the inspection, marking and/or repair process.

The imaging device 1451 may also be equipped with a distance measuring system (not shown). The distance measuring system can be used for both the marking process and for validation of component repair. An array of spots or lines can be projected by a laser in the distance measuring system, and this projection can be captured by the imaging device 1451. The operator can then confirm if the repair has been completed as desired.

Figure 16:
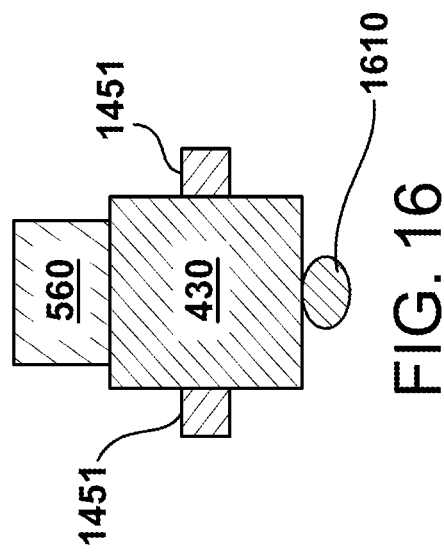
FIG. 16 illustrates a simplified schematic view of the end effector having multiple attachments.

FIG. 16 illustrates a simplified schematic of the end effector 430 equipped with a debris removal system 1610, such as a vacuum. The debris removal system can facilitate removal of debris or particulate matter caused during the repair process. The vacuum can include a hose (not shown) routed out of the dynamoelectric machine and into a collection receptacle (not shown).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An apparatus adapted for servicing a dynamoelectric machine component comprising:
    a tool delivery mechanism adapted for delivering a tool to a desired location in the dynamoelectric machine;
    a tool support fixture adapted to be secured onto the body of the dynamoelectric machine, the tool support fixture for supporting and adjusting the tool delivery mechanism;
    a sleeve mechanism attached to the tool support fixture, the sleeve mechanism disposed around a portion of the tool delivery mechanism, the sleeve mechanism comprising one or more clamps attached to a portion of the tool delivery mechanism, a sleeve disposed around a portion of the tool delivery mechanism, one or more shaft collars disposed around a portion of the sleeve, a holder body, and one or more flanged bearings disposed between the holder body and the one or more shaft collars; and
    wherein, the apparatus is adapted to service the component of the dynamoelectric machine in-situ.

2. The apparatus of claim 1, the apparatus in combination with the dynamoelectric machine, wherein the dynamoelectric machine is at least one of: a gas turbine, a steam turbine, and a compressor.

3. The apparatus of claim 2, wherein the component is at least one of:
    a rotor airfoil, a rotor blade, or a stator vane.

4. The apparatus of claim 3, wherein the dynamoelectric machine is the compressor and the component is the rotor airfoil or the rotor blade, and wherein the component is part of an R0 or R1 stage of the compressor.

5. The apparatus of claim 3, wherein the dynamoelectric machine is the compressor and the component is the stator vane, and wherein the component is part of an S0 or S1 stage of the compressor.

6. The apparatus of claim 1, the tool delivery mechanism further comprising:
    a handle attached to a first end plate;
    a middle link attached to the first end plate by a first plurality of universal joints;
    an end effector attached to a second end plate, where the second end plate is attached to the middle link by a second plurality of universal joints.

7. The apparatus of claim 1, the tool delivery mechanism further comprising:
    a handle attached to a first end plate;
    a middle link attached to the first end plate by a first plurality of joints;
    an end effector attached to a second end plate, where the second end plate is attached to the middle link by a plurality of joints.

8. The apparatus of claim 7, the middle link further comprising:
    a first rod, a rotary rod, and a third rod.

9. The apparatus of claim 7, the middle link further comprising a plurality of rods.

10. The apparatus of claim 7, the end effector further comprising:
    a tool retention clamp for retaining a tool;
    one or more supporting shafts connected to the tool retention clamp;

a thread screw for moving the tool retention clamp and the tool along the one or more supporting shafts.

11. The apparatus of claim 10, further comprising:
one or more bevel gears connected to the thread screw and one of the plurality of rods;
wherein rotation of one of the plurality of rods drives the one or more bevel gears.

12. The apparatus of claim 10, the tool comprising at least one of:
a grinder, a sander, a polisher, a marking device, or a pen.

13. The apparatus of claim 1, the tool support fixture further comprising:
a holder body disposed around a portion of the tool delivery mechanism;
an adaptor mount attached to the holder body;
a dovetail shaped base attached to the adaptor mount; and
one or more screws for adjusting the position of the adaptor mount on the dovetail shaped base.

14. The apparatus of claim 13, further comprising a linear motion stage, the linear motion stage comprising:
one or more vertical members;
a mounting plate disposed over a portion of the one or more vertical members;
a lead screw connected to the mounting plate, the lead screw operable to move the mounting plate along the one or more vertical members; and
a dovetail mount for accepting the dovetail shaped base.

15. The apparatus of claim 1, the tool comprising an imaging device, wherein the imaging device is at least one of:
a visual camera, an infrared camera, a non-visual imaging device, or an ultrasonic imaging device.

16. The apparatus of claim 1, the tool comprising a distance measuring system.

17. The apparatus of claim 1, the tool comprising a vacuum.

18. An apparatus adapted for servicing a dynamoelectric machine component comprising:
a tool delivery mechanism adapted for delivering a tool to a desired location in the dynamoelectric machine;
a tool support fixture adapted to be secured onto the body of the dynamoelectric machine, the tool support fixture for supporting and adjusting the tool delivery mechanism, the tool support fixture comprising a holder body disposed around a portion of the tool delivery mechanism, an adaptor mount attached to the holder body, a dovetail shaped base attached to the adaptor mount, and one or more screws for adjusting the position of the adaptor mount on the dovetail shaped base;
a sleeve mechanism attached to the tool support fixture, the sleeve mechanism disposed around a portion of the tool delivery mechanism; and
wherein, the apparatus is adapted to service the component of the dynamoelectric machine in-situ.

19. The apparatus of claim 18, the apparatus in combination with the dynamoelectric machine, wherein the dynamoelectric machine is at least one of: a gas turbine, a steam turbine, and a compressor.

20. The apparatus of claim 19, wherein the component is at least one of:
a rotor airfoil, a rotor blade, or a stator vane.

21. The apparatus of claim 20, wherein the dynamoelectric machine is the compressor and the component is the rotor airfoil or the rotor blade, and wherein the component is part of an R0 or R1 stage of the compressor.

22. The apparatus of claim 20, wherein the dynamoelectric machine is the compressor and the component is the stator vane, and wherein the component is part of an S0 or S1 stage of the compressor.

23. The apparatus of claim 18, the tool delivery mechanism further comprising:
a handle attached to a first end plate;
a middle link attached to the first end plate by a first plurality of universal joints;
an end effector attached to a second end plate, where the second end plate is attached to the middle link by a second plurality of universal joints.

24. The apparatus of claim 18, the tool delivery mechanism further comprising:
a handle attached to a first end plate;
a middle link attached to the first end plate by a first plurality of joints;
an end effector attached to a second end plate, where the second end plate is attached to the middle link by a plurality of joints.

25. The apparatus of claim 24, the middle link further comprising:
a first rod, a rotary rod, and a third rod.

26. The apparatus of claim 24, the middle link further comprising a plurality of rods.

27. The apparatus of claim 24, the end effector further comprising:
a tool retention clamp for retaining a tool;
one or more supporting shafts connected to the tool retention clamp;
a thread screw for moving the tool retention clamp and the tool along the one or more supporting shafts.

28. The apparatus of claim 27, further comprising:
one or more bevel gears connected to the thread screw and one of the plurality of rods;
wherein rotation of one of the plurality of rods drives the one or more bevel gears.

29. The apparatus of claim 27, the tool comprising at least one of:
a grinder, a sander, a polisher, a marking device, or a pen.

30. The apparatus of claim 18, further comprising a linear motion stage, the linear motion stage comprising:
one or more vertical members;
a mounting plate disposed over a portion of the one or more vertical members;
a lead screw connected to the mounting plate, the lead screw operable to move the mounting plate along the one or more vertical members; and
a dovetail mount for accepting the dovetail shaped base.

31. The apparatus of claim 18, the tool comprising an imaging device, wherein the imaging device is at least one of:
a visual camera, an infrared camera, a non-visual imaging device, or an ultrasonic imaging device.

32. The apparatus of claim 18, the tool comprising a distance measuring system.

33. The apparatus of claim 18, the tool comprising a vacuum.

* * * * *